United States Patent
Brush et al.

(10) Patent No.: US 6,917,625 B1
(45) Date of Patent: Jul. 12, 2005

(54) INTELLIGENT PERIPHERAL CONCENTRATOR

(75) Inventors: Wesley A. Brush, Brick, NJ (US); Jiayu Chen, Morganville, NJ (US); Edite M. Hanlon, Freehold, NJ (US); Christopher J. Hefele, Hoboken, NJ (US); Steven M. Michelson, Freehold, NJ (US); Azeem A. Timmapuri, Hamilton Square, NJ (US)

(73) Assignee: AT&T Corp., New York, NY (US)

(*) Notice: Subject to any disclaimer, the term of this patent is extended or adjusted under 35 U.S.C. 154(b) by 878 days.

(21) Appl. No.: 09/760,585

(22) Filed: Jan. 16, 2001

(51) Int. Cl.$^7$ .............................. H04J 3/16; H04M 7/00
(52) U.S. Cl. ..................... 370/437; 370/352; 379/230
(58) Field of Search .............................. 370/352, 437, 370/410, 522, 524, 353; 379/230, 242, 229, 221.11

(56) References Cited

U.S. PATENT DOCUMENTS

| | | | | |
|---|---|---|---|---|
| 6,064,729 A | * | 5/2000 | Cookson | 379/230 |
| 6,128,379 A | * | 10/2000 | Smyk | 379/230 |
| 6,222,826 B1 | * | 4/2001 | Faynberg et al. | 370/252 |
| 6,332,023 B1 | * | 12/2001 | Porter et al. | 379/242 |
| 6,728,239 B1 | * | 4/2004 | Kung et al. | 370/352 |
| 2002/0087665 A1 | * | 7/2002 | Marshall et al. | 709/220 |

* cited by examiner

Primary Examiner—Afsar Qureshi

(57) ABSTRACT

The invention provides methods and systems for the use of an Intelligent Peripheral Concentrator (IPC) in a network that enables more efficient use of Ipe resources. In a first embodiment the IPC receives at least one request from at least one network element, determines necessary resources according to the request(s) and establishes a connection with an intelligent peripheral based on the necessary resources. A second embodiment is a concentrator for connecting intelligent peripherals to a network, having a connection point for connecting an intelligent peripheral, a connection point for connecting to a network and a switch for directing information from the network to the intelligent peripheral. A third embodiment is a system for utilizing intelligent peripherals having a device connected to a first switch, the first switch connected to a second switch, an intelligent peripheral concentrator connected to the first switch and the intelligent peripheral connected to the intelligent peripheral concentrator.

12 Claims, 6 Drawing Sheets

| IPC ID | IPe ID | PROTOCOL/ STATUS | FEATURE ID | FEATURE ID | ... |
|--------|--------|------------------|------------|------------|-----|
| 660    | 662    | IP/BUSY          | VOICE MAIL | MUSIC      |     |
|        | 664    | ATM/READY        | DIGIT-ID   |            |     |
| 670    | 672    | ISDN/BUSY        | VIDEO      |            |     |
|        | 674    | X.25/BUSY        | HTML       | CREDIT VERIFY |  |

Columns: 610, 620, 630, 640, 650

INTELLIGENT PERIPHERAL CONCENTRATOR

BACKGROUND OF THE INVENTION

1. Field of Invention

The invention relates to intelligent peripherals and packet networks.

2. Description of Related Art

People wanting to communicate with other people over long distances use telephones, computers and the like to connect through networks. Occasionally, these people need to leave or receive messages, receive services such as video, music or other services, receive or send facsimile messages and send or receive data. One type of device that saves messages, stores video information, stores music information, or stores data is an Intelligent Peripheral (IPe).

Currently, Intelligent Peripherals (IPe's) provide extended capabilities to telecommunications networks, such as announcement playback, digit collection, speech recognition, call origination and service logic modules that use in-band communication with calling/called parties. Unfortunately, current network designs do not efficiently utilize IPe platforms. Current IPe platforms are based on circuit-switched technology which requires bandwidth to be dedicated for the duration of the connection. Furthermore, current circuit-switched IPe resources are physically attached to individual switches, requiring remote access from one switch through another switch for users not physically attached to the local switch. This arrangement uses the resources of two switches, which is wasteful and inefficient. A broadening demand for data services, such as cable television servers, web servers, video servers, music servers, etc., has caused increased demand for, and flexibility in the use of, IPe services. Thus, new technology is needed to improve IPe utilization.

SUMMARY OF THE INVENTION

The invention provides methods and systems for the use of an Intelligent Peripheral Concentrator (IPC) in a network that enables more efficient use of Intelligent Peripherals (IPe) resources.

An IPe can be connected to a network in many ways. For example, in a circuit-switched network, a circuit-switched IPe can be directly connected at any point in the network. A packet-based IPe can be connected to a packet-based network at any point. However, if circuit-switched IPe devices are used in a packet-based network, or a packet-based IPe is used in a circuit-switched network, a middle device is necessary. Otherwise a circuit-switched IPe must be located at a device known as an edge switch.

Limiting the circuit-switched IPe's to edge switches lowers their average utilization. Users must reach the edge switch directly connected to an IPe before using the IPe, which results in inefficient use of resources. The present invention provides a more efficient device to enable all types of IPe's to be located anywhere on the network. The device in the invention can be referred to as an Intelligent Peripheral Concentrator (IPC). The IPC is located between one or more IPe's and a network. Users needing IPe services are connected to an IPC that then handles all interactions with the IPe. Thus, IPe devices can be located with greater flexibility, creating efficiencies.

The present invention is a system and method that includes an IPC for managing at least one intelligent peripheral resource of a network. The IPC can receive requests for intelligent peripheral resources initiated by a device, such as a computer, fax machine, information server or telephone. In response, the IPC can determine the availability of the requested IPe resource(s) necessary to fulfill the request. If available, the IPC can establish a connection with the requested IPe resources to satisfy the request.

An exemplary embodiment can also include establishing additional connections to additional intelligent peripherals for additional requests when multiple intelligent peripherals are available.

Additionally, the IPC includes the ability to determine the functionality of an intelligent peripheral, determine the availability of that intelligent peripheral and utilize the determined information to establish the connection. The IPC may receive requests that refer to packet-based and circuit-switched media streams. The exemplary embodiment may receive the request from an edge switch, a router, a service control point, the Internet, another IPC, or a cable connection.

The present invention can include an IPC for connecting intelligent peripherals to a network. The exemplary IPC has at least one connection point for connecting an intelligent peripheral, at least one connection point for connecting to a network and at least one routing device for directing information from the network to the at least one intelligent peripheral. The IPC may also have at least one processor for processing information from the network and information from the intelligent peripheral and memory for storing at least one of intelligent peripheral status, request information, capability information, and network information. The exemplary embodiment may have the connection point for connecting to the network use packet-based or circuit-based technology. Alternately, the exemplary embodiment may have the connection point for connecting to the network that uses at least one of Asynchronous Transfer Mode (ATM), Internet Protocol (IP), SONET, X.25, ISDN or any other network protocol. The exemplary embodiment may perform a media format translation function.

In other words, this invention provides an Intelligent Peripheral Concentrator (IPC) located between one or more IPe's and a network. Users needing IPe service are connected to an IPC that then handles all interactions with the IPe. Thus, IPe devices can be located with greater flexibility, creating efficiencies.

Thus, the present invention increases IPe utilization by using the IPC, which can terminate both circuit-switched and packet-switched media streams and can convert from one to the other, to allow IPe devices to operate through a network that uses a media format that is not native to the IPe. The IPC may allocate switching resources at packet transfer, rather than for the entire duration of a request. Thus while an IPe is dedicated to a particular request, the IPC can route and handle additional requests.

The IPC provides the results of the IPe work to a user or other network device and provides user commands to the IPe. The IPC maintains the connection for the IPe, and transmits commands to the IPe as the commands are received. Thus, one IPC can deliver services to multiple users at the same time, utilizing the IPe's more efficiently.

Further, if a service is requested when there are no IPe devices available, the IPC can transfer the request to another IPC, allowing for load balancing. Thus, if all IPe devices at a particular location are in use, the request for service can be efficiently re-routed.

Other features and advantages of the present invention are described below and are apparent from the accompanying drawings and from the detailed description, which follows.

BRIEF DESCRIPTION OF THE DRAWINGS

The invention is described in connection with the following Figures, wherein like numerals represent like elements, and wherein:

FIG. 4 is an exemplary diagram of a data structure for storing the status of IPe resources;

DETAILED DESCRIPTION OF PREFERRED EMBODIMENTS

Figure 1:
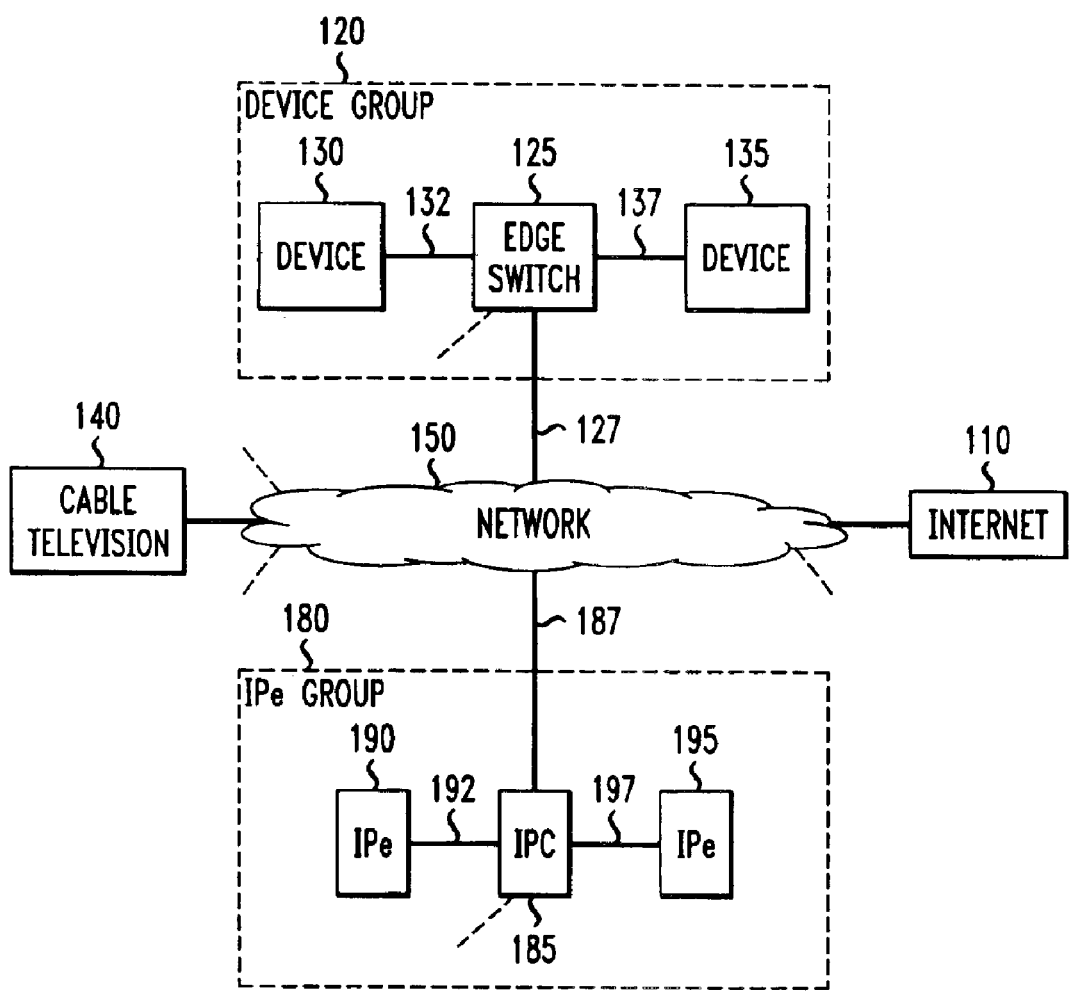
FIG. 1 is an exemplary block diagram of an intelligent peripheral concentrator system according to the present invention.

FIG. 9 is a block diagram of an exemplary intelligent peripheral concentrator system 100 that includes a network 150, the Internet 110, Cable Television group 140, device group 120, and IPe group 180. The device group 120 includes an edge switch 125, and network devices 130, 135. The IPe group 180 includes an intelligent peripheral concentrator (IPC) 185 and intelligent peripheral equipment (IPe) 190 and 195.

The IPC 185 permits the IPes 190 and 195 to be disassociated with specific local access providers such as edge switch 125 so that IPes 190 and 195 may be allocated to any local access provider in the network 50 for IPe services. Also, the IPC 185 may serve as a protocol buffer so that circuit-switched and packet-based IPes may provide IPe services independent of whether the network 150 is a circuit-switched network or a packet-based network. In addition, multiple IPCs 185 allow distribution of IPe service capability through out the network 150 for more efficient network usage so that IPes 190 and 195 may be properly-distributed based on volume of use. Thus, the IPC 185 may receive requests for IPC services from any element in the network 150, e.g., local access providers, routers, etc., and allocate IPC services based on IPe resource availability.

The IPes 190 and 195 may be circuit-switch or packet-based intelligent devices. The IPe's may be capable of functions such as digit collection, voice recording, voice playback, video recording, video playback, music recording, music playback, announcement playback, processing collect calls, forwarding requests and information, pager notifications, telephonic alerts and other now known or later developed features for intelligent peripherals.

In operation, the IPes 190 and 195 provide intelligent services to the calling or called parties. For example, when the network device 130 requests music playback, the IPe 190 may be selected to perform the required services. The IPe 190 may also. interact with the network device 130 to determine the type of service that may be required by announcing "May I help you?", for example.

In this exemplary embodiment, the network 150 can be a packet-based network, such as an ATM network, and the edge switch 125 can include capabilities to convert circuit-switched signals into packet-based signals. For example, if the network device 130 is a circuit-switched device, such as an ordinary telephone station, the edge switch 125 interfaces with the network device 130 in a circuit-switched manner. However, the signals received from the network device 130 are converted into data packets and transmitted over the network 150. In a similar manner, the data packets received by the edge switch 125, from the network 150 that are destined for the network device 130 are converted into circuit-switched signals and transmitted to the network device 130.

The IPes 190 and 195 can be either circuit-switched or packet-based. A circuit-switched IPe handles media in a Time Division Multiplexed (TDM) format; a packet-based IPe handles media that is packetized (e.g., ATM cells or IP packets). If the IPes 190 and 195 are circuit-switched, then the IPC 185 can serve as an interface to convert the packets received from the network 150 to TDM signals. In a similar manner, the IPC 185 can convert TDM signals received from the IPes 190 and 195 into packets for transmission over the network 150.

The network 150 may be a circuit-switch or packet-based such as Internet protocol (IP), asynchronous transfer mode (ATM), or other network. Furthermore, the network 150 may be a single network or a plurality of networks, such as the Internet, of the same or different types. For example, the network 150 may include a local telephone network in connection with a long-distance network (such as an AT&T long-distance network). Furthermore, the network may be a data network or a telecommunications network in connection with the data network. Any combination of telecommunications, cable and data networks may be used without departing from the spirit and scope of the present invention. The network may be composed of electrical or optical switches, HUBS, routers, multiplexers or other known or any later developed data transfer devices. For the purposes of discussion, it will be assumed that network 150 is a single data packet network.

While FIG. 1 shows only one IPe group and one device group, it should be understood that multiple IPe groups and device groups can be attached to the network 150 at various locations without departing from the spirit and scope of the present invention. The devices 130 and 135 may be a telephone, a personal computer (functioning as a telephony device), a video phone or any other now known or later developed device capable of transmitting messages to be received by an intelligent peripheral.

One advantage of the invention is that the IPC system 100 provides efficient IPe resource utilization because IPe's 190 and 195 may be freely assigned by the IPC 185 to service any network device 130 or 135 without limitation.

Figure 2:
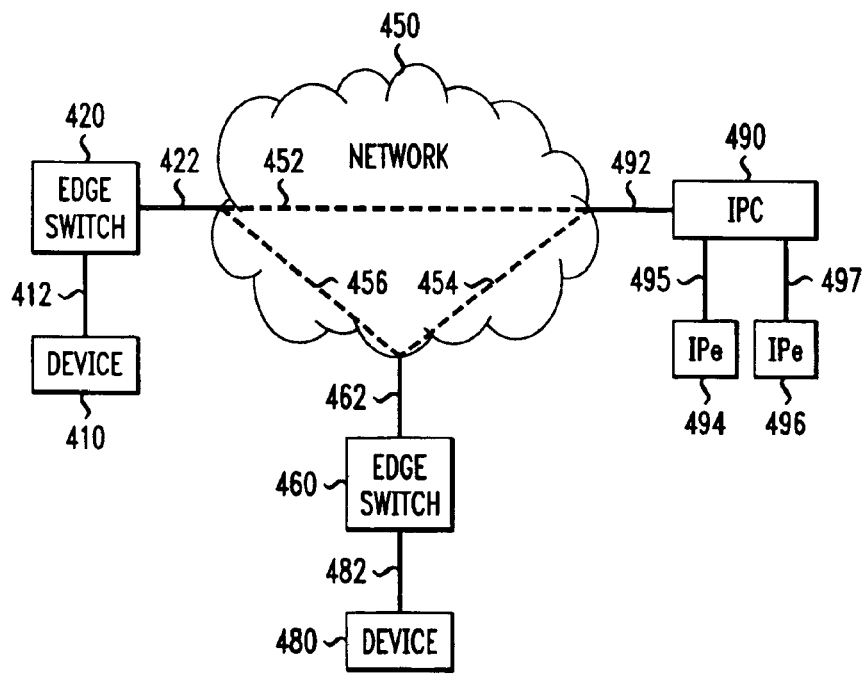
FIG. 2 is an exemplary block diagram of an embodiment of IPe devices operating in a network through an intelligent peripheral concentrator.

FIG. 2 shows an exemplary block diagram of an intelligent peripheral resource allocating system 400. The system 400 includes IPC 490 for determining an amount of and distribution of intelligent resources to requesting devices 410 and 480. The network 450 connects edge switches 420 and 460 to IPC 490 via links 422, 462 and 492. The IPC 490 connects to IPe's 494 and 496 via links 495 and 497. The edge switch 420 is connected to device 410 by link 412 and the edge switch 460 is connected to device 480 by link 482.

The IPC 490, for example, can provide IPe service to a communication between the network devices 410 and 480. Assuming that the network device 410 is a calling party requesting a video playback from network device 480, the edge switch 420 may first contact the IPC 490 for IPe service via links 422, 452 and 492. The IPC 490 may allocate IPe 494, for example, and route the communication signals received from the network device 410 to the selected IPe 494 via the link 495.

The IPe 494 can then collect the address information of the destination device 480. If it is required, the IPe 494 can communicate with the destination device 480 (e.g., to approve the video playback request), then the IPC 490 may simply convert the circuit-switched signals of the IPe 494 into data packets and transmit the data packets via the links 492, 454, 462 and 482 to the destination device 480 via the edge switch 460.

When the IPe service is completed (e.g., the video playback is operational), the IPe 494 may issue routing commands to connect network devices 410 and 480 through links 412, 422, 456, 462, and 482 and edge switches 420 and 460. The IPC 490 may also set necessary control parameters to indicate that the owner of device 410 should be billed for the call. The IPC 490 can then reallocate IPe 494 to handle additional incoming call traffic. The commands may alternately be issued by the IPC 490.

While the IPC 490 is shown as an independent unit coupled to the network 450, it can also be incorporated into the devices 410 and or may be distributed throughout the network 450. For example, the IPC 490 may be part of the various central offices or servers (not shown) employed by the network 450 which are distributed throughout the network 450. Any configuration that permits distribution and control of the intelligent peripheral resources can be used without departing from the spirit and scope of the present invention.

The various links mentioned heretofor may be any type of connection that allows for the transmission of information. Some examples include conventional telephone lines, digital transmission facilities, fiber optic lines, direct serial/parallel connections, cellular telephone connections, satellite communication links, local area networks (LANs), intranets and the like.

Figure 3:
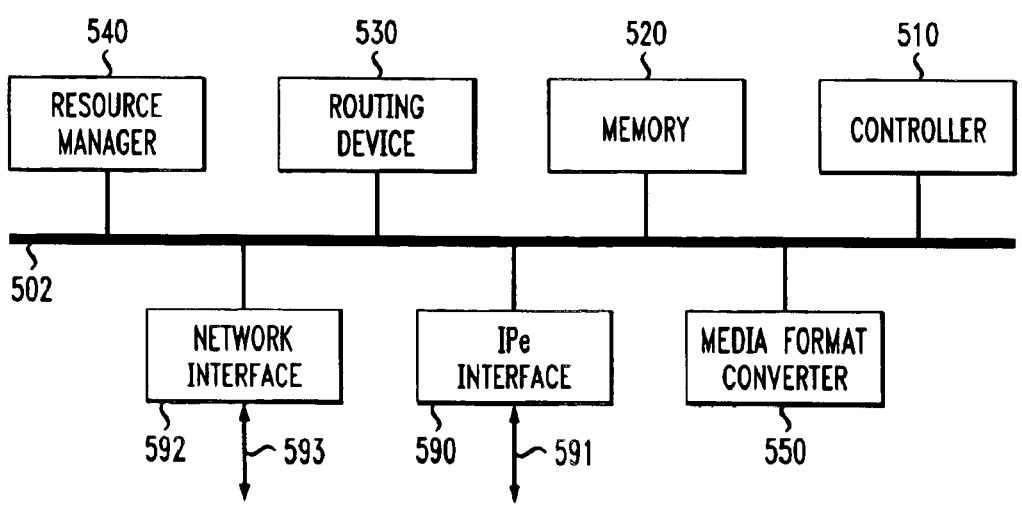
FIG. 3 is an exemplary block diagram of an exemplary intelligent peripheral concentrator.

FIG. 3 shows an exemplary block diagram of the IPC 490. The IPC 490 includes a resource manager 540, a routing device 530, a memory 520, a controller 510, a network interface 592, an IPe interface 590, and a media format converter 550. The above components may be coupled together via signal bus 502.

When, for example, a user is requesting a video playback, the various devices are used in the following manner. The request for a video playback is received by the network interface 592 via port 593. Under the instruction of the controller 510, the network interface 592 can then pass the request to the controller 510. The controller 510 may store the request in the memory 520 for temporary storage or queuing purposes. The controller 510 can then check the resource manager 540 for an appropriate IPe to service the request. Once the controller 510 or the resource manager 540 determines which IPe resources are necessary, it then may use the media format converter 550 to change the format of the media stream from the format used by the originating device to the format used by the IPe (e.g., IP to TDM). The controller then may utilize the routing device 530 to set up a pathway through IPe interface 590 via the port 591 to the IPe. Subsequent messages from the requesting machine may be simply forwarded from the network interface 592 to the IPe interface 590 using the information contained in the routing device 530.

Once the IPe receives the request for a video playback, it may return a response such as "Operator, how may I help you?" The response from the IPe will be received in the IPe interface 590 and forwarded to the network interface 592, as controlled by the routing device 530. The response may also need to be converted by the media format converter 550 from the media format used by the IPe to the media format used by the requesting device or other network element.

The allocation of the IPe interface 590, and thereby allocation of an IPe, can be tracked in the resource manager 540. Alternatively, the resource manager 540 can be part of the memory 520 or of the routing device 530. The signal indicating that the IPe has completed the services requested can originate from the IPe interface 590 or the network interface 592, to be recorded in the resource manager 540. The resource manager 540 may also track additional information about the network and the location and availability of other resources as explained below.

While FIG. 3 shows a bus architecture, other hardware configurations may also be possible as is well known in the art. In addition, while FIG. 3 shows the controller 510, routing device 530 and resource manager 540 as separate units, the functions performed by these units may be combined or may be further divided among specific processors such as digital signal processors and/or performed by dedicated hardware such as application specific integrated circuits (ASIC) or other hardware implementation such as PLD, PAL or PLAs, for example.

Moreover, the IPC 490 can be implemented as software executing on a suitable general purpose computer, a special purpose computer, a microprocessor or the like performing the above described functions.

In another exemplary embodiment, the IPe interface 590 may receive the message to be forwarded to the network. The controller 510 can then utilize the routing device 530 and may use the media format converter 550 to forward the message to the network interface 592.

The routing device 530 may be set such that, after the initial routing decisions have been made, messages received through a network interface 592 are immediately forwarded to the IPe interface 590 via the routing device 530 and possibly converted using media format converter 550.

The resource manager 540 may take the form of a table and a memory, such as shown in FIG. 4. FIG. 4 shows a data structure 600 for recording device status. The data structure 600 includes an IPC ID field 610, IPe ID field 620, protocol/status field 630, and feature ID fields 640 and 650. The entries of the table 600 may define all of the conditions for determination of the status of IPe and network resources. For example, IPC ID field 610 shows that IPCs 660 and 670 are present. The IPe ID field 620 shows that IPes 662, 664, 672 and 674 are present. The protocol field 630 shows that IPe 662 is Internet Protocol (IP) based and busy; IPe 664 is ATM based and ready; IPe 672 is ISDN based and busy; and IPe 674 is X.25 based and busy. Feature ID fields 640 and 650 show that IPe 662 has voice mail and music playback capabilities, that IPe 664 has digit recognition capabilities, that IPe 672 has video playback capabilities, and that IPe 674 can serve HTML web pages and can process credit transactions. The IPe resource manager 540 may include other features or parameters to track other features used by IPe devices.

The data structure 600 can be a data file, a database, a spreadsheet, settings within random access memory (RAM) or any other means for tracking data.

Figure 5:
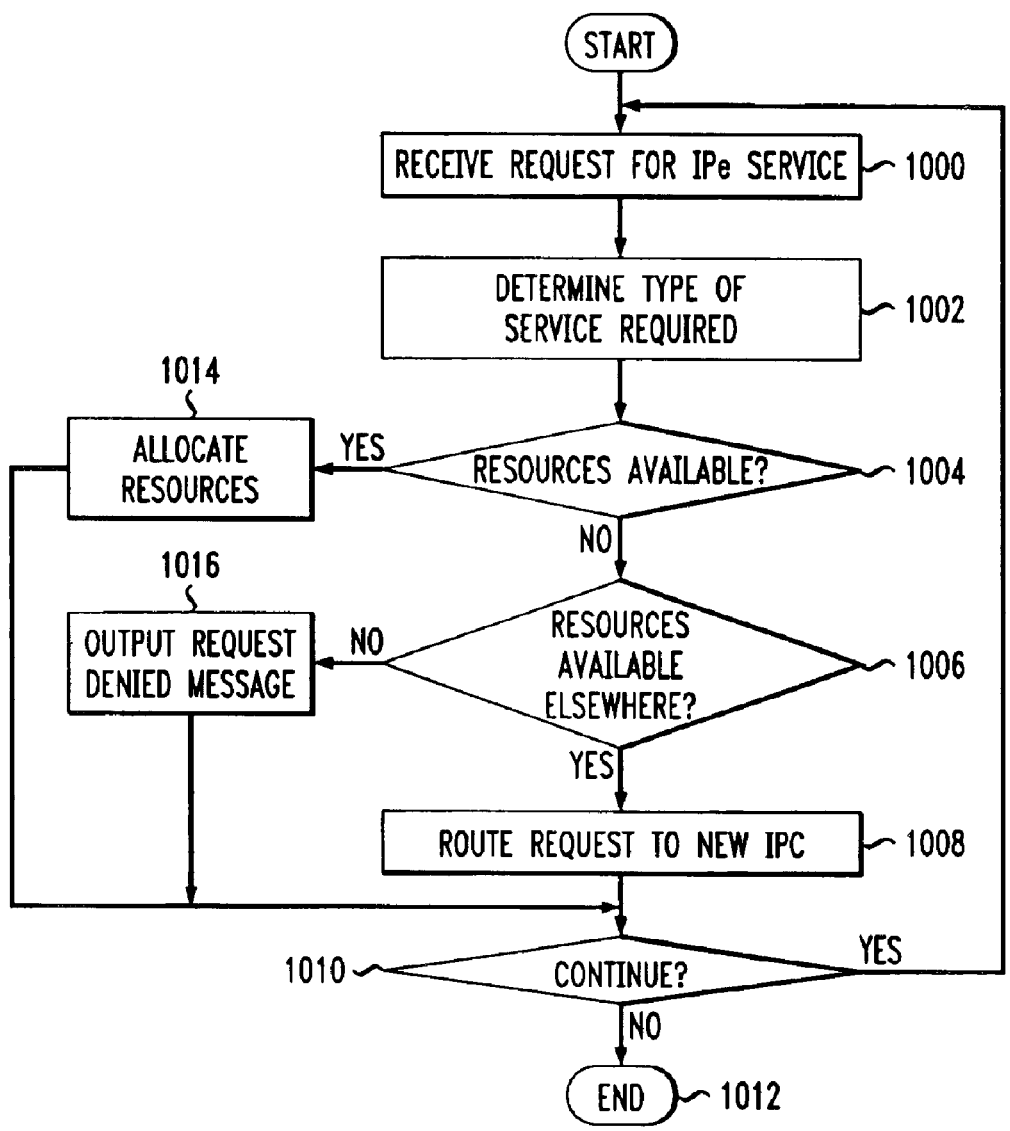
FIG. 5 is a flowchart outlining an exemplary operation of an IPC.

FIG. 5 shows a flowchart of an exemplary process for allocating IPe resources to a device in response to receiving a request. The process starts at step 1000, where a request for IPe service is received and continues to step 1002. In step 1002, a determination is made of the type of service required and control continues to step 1004. In step 1004, a determination is made whether the type of service required meets the resources available. If the resources are available, control jumps to step 1014 where the resources are allocated and control continues to step 1010. Otherwise, control continues to step 1006.

In step 1006, a determination is made whether the resources are available elsewhere, for example in another IPC as shown above in FIG. 6. If the resources are available elsewhere, control continues to step 1008; otherwise, control jumps to step 1016 where a request denied message is output, and control continues to step 1010. In step 1008, the request is routed to the new IPC and control continues to step 1010.

In step 1010, a determination is made whether the process should continue. If the process should continue, control jumps back to step 1000; otherwise, the process ends in step 1012.

Figure 6:
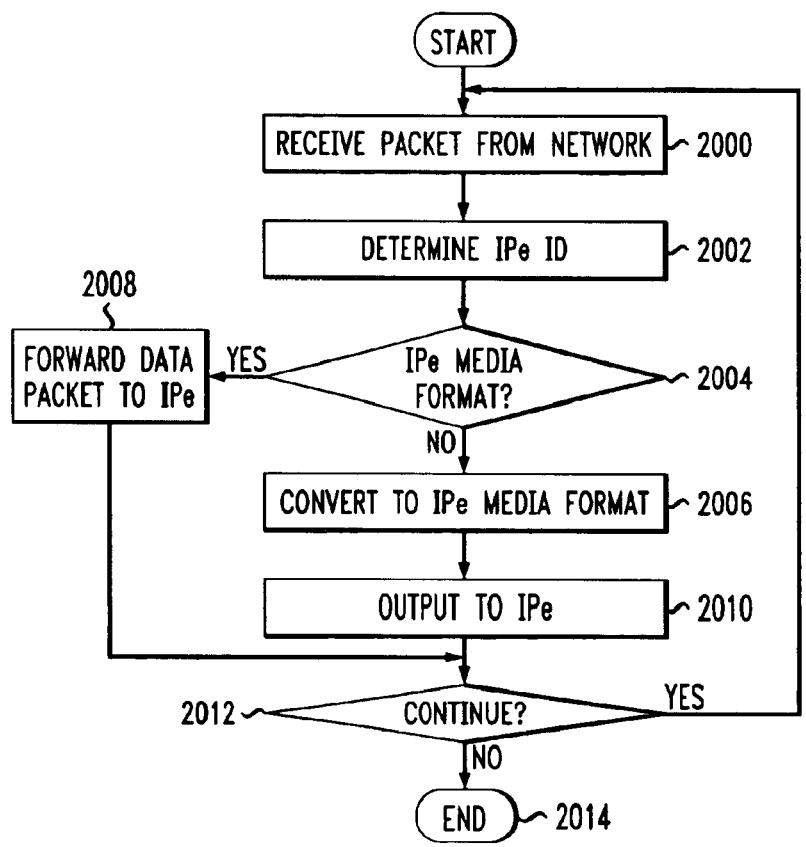
FIG. 6 is a flowchart outlining an exemplary operation of an IPC forwarding information to an IPe.

FIG. 6 shows a flowchart of an exemplary process within an IPC after the resources have been allocated in step 1014 above. The process begins in step 2000, where a data packet is received from the network. Control then continues to step 2002.

In step 2002, a determination is made of the IPe ID associated with the data packet, control then continues to step 2004. In step 2004, a determination is made whether the IPe uses the same media format as the incoming data packet. If the IPe uses the same media format as the incoming data packet, control jumps to step 2008, where the data packet is forwarded to the IPe. Control then continues to step 2012.

If the IPe uses a different media format, control continues to step 2006. In step 2006, the packet is converted to the media format used by the IPe and control then continues to step 2010. In step 2010, the data is output to the IPe. Control then continues to step 2012.

In step 2012, a determination is made whether the process should continue. If the process should continue, control jumps back to step 2000; otherwise the process ends in step 1014.

Figure 7:
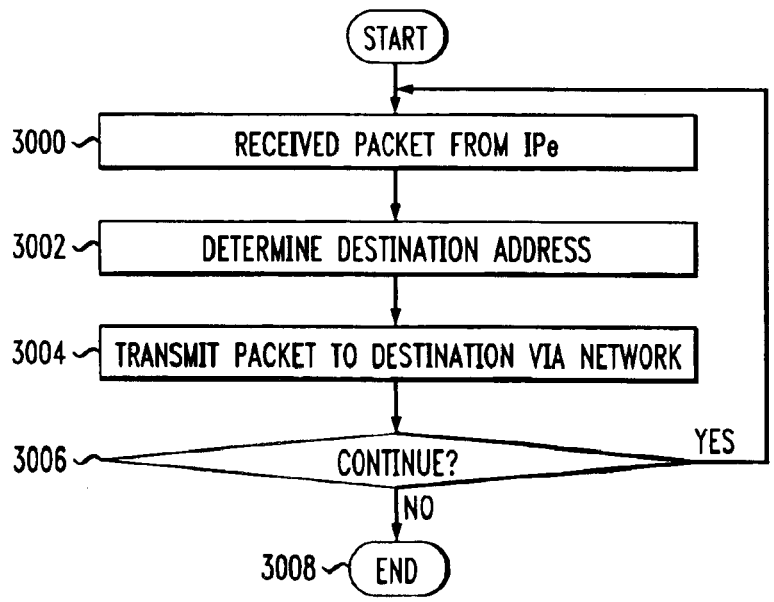
FIG. 7 is a flowchart outlining an exemplary operation of an IPC forwarding information from a packet-based IPe.

FIG. 7 shows a flowchart of an exemplary process of the IPC transferring data from the IPe to the network that uses the same media format as the IPe. The process begins in step 3000, where a data packet is received from the IPe; control then continues to step 3002. In step 3002, a determination is made about the destination address for the data packet; control then continues to step 3004. In step 3004, the data packet is transmitted to the destination via the network and control continues to step 3006.

In step 3006, a determination is made whether the process should continue. If the process should continue, control jumps back to step 3000; otherwise the process ends in step 3008.

Figure 8:
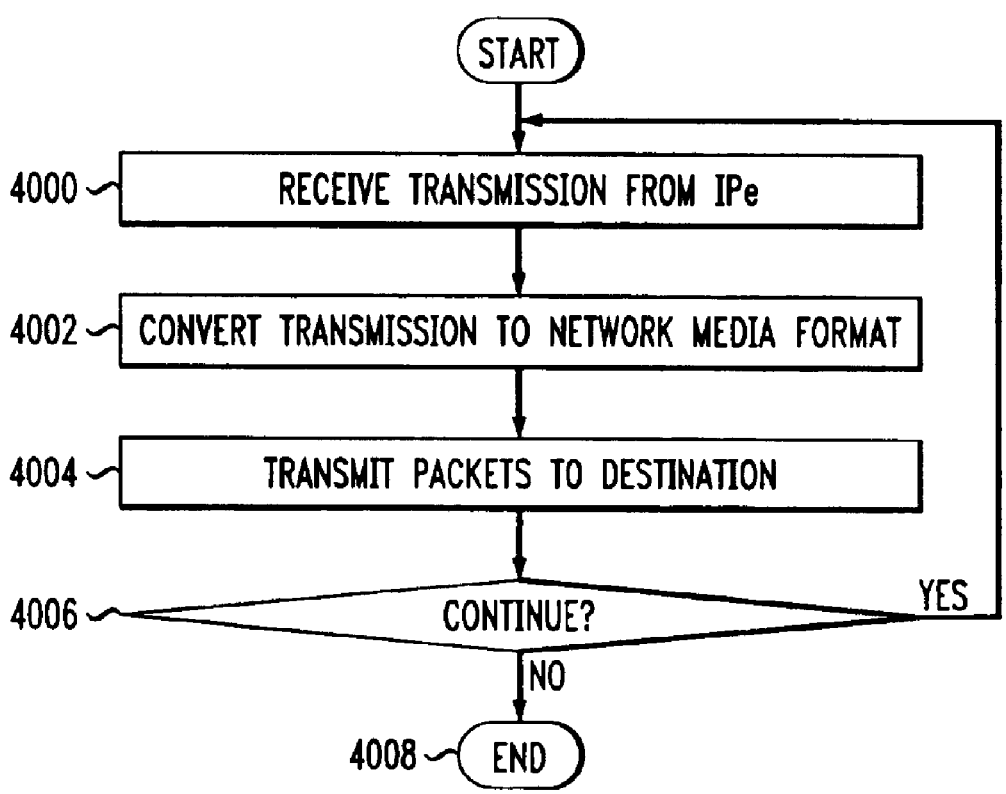
FIG. 8 is a flowchart outlining an exemplary operation of an IPC forwarding information from a circuit-switched IPe.

FIG. 8 shows a flowchart of an exemplary process of an IPC transferring data from an IPe to a network that uses a different media format. The process begins in step 4000, where a transmission is received from the IPe and control continues to step 4002. In step 4002, the transmission is converted from the native media format used by the IPe to the media format used in the network and control continues to step 4004. In step 4004, the data packet is transmitted to the destination address and control continues to step 4006.

In step 4006, a determination is made whether the process should continue. If the process should continue, control jumps back to step 4000; otherwise, the process ends in step 4008.

As shown in FIG. 3, the method of this invention is further implemented on a program processor. However, the intelligent peripheral concentrator (IPC) 490 can also be implemented as part of a switch or a stand-alone on a general purpose or a special purpose computer, a programmed or microprocessor or controller and peripheral integrated circuit elements, one or more Application Specific Integrated Circuits (ASICs) or other integrated circuits, a hardware electronic or logic circuit, such as a discrete element circuit, a programmed logic device such as a PLD, PLA, FPGA, or PAL, or the like. In general, any device on which exists a finite state machine capable of implementing the flow charts shown in FIGS. 5–8 can be used to implement the intelligent peripheral concentrator 490 functions of this invention.

The present invention can include a system for utilizing Intelligent Peripherals having at least one device connected to at least one switch, the at least one switch connected to at least one other switch, at least one intelligent peripheral concentrator connected to the at least one switch and at least one intelligent peripheral connected to the at least one intelligent peripheral concentrator.

The exemplary embodiment may also have at least one service control point accessible by each switch. The exemplary embodiment may then have the service control point direct telephone calls to either the intelligent peripheral concentrators or other network resources depending on the services required. The exemplary embodiment may also have switches that switch media streams that are either packet-based or TDM-based.

Alternatively, the exemplary embodiment may have the intelligent peripheral concentrator perform a translation from the native IPe media format to the network media format. The exemplary embodiment may have the intelligent peripheral perform at least one of digit collection, user verification, financial data collection, announcement playing, video playing, music playing, facsimile receiving, voice recording, recording playback, and voice recognition. In addition, the exemplary embodiment may have the intelligent peripheral concentrator perform traffic management functions by tracking the status and capabilities of the intelligent peripherals and directing requests based on the abilities and status of the intelligent peripherals. The exemplary embodiment may have connections that are at least one of radio waves, microwaves, wired connections, networks, fiber optic connections and physical connections.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for assigning intelligent peripheral resources of a network, comprising:

arranging the intelligent peripheral resources into a plurality of groups;

receiving a request for an intelligent peripheral service from a first requesting element of any element in the network;

identifying an intelligent peripheral resource in response to the request;

assigning the identified intelligent peripheral resource to the first requesting element; and forward the request from a first group to a second group if the identified intelligent peripheral resource that was assigned the request is not sufficient to meet the request.

2. The method of claim 1, further comprising:

receiving an additional request in the first group for another intelligent peripheral resource from a second requesting element; and assigning intelligent peripheral resource of the first group to the second element if such intelligent peripheral resource is available in the first group.

3. The method of claim 1, wherein the intelligent peripheral resources are supplied by one or more intelligent peripherals, the identifying step identifying one of the intelligent peripherals that is able to satisfy the request, the assigning step assigning the identified intelligent peripheral to the request.

4. The method of claim 1, wherein the request is received from a packet-based media stream.

5. The method of claim 1, wherein the request is received from a circuit-switch based media stream.

6. A system for utilizing intelligent peripheral resources of a network, comprising:

at least one device coupled with at least one first switch, the at least one first switch being coupled with at least one other switch through the network;

at least one intelligent peripheral concentrator coupled with the at least one first switch through the network; and at least one intelligent peripheral coupled with the intelligent peripheral concentrator, wherein the at least one intelligent peripheral concentrator performs a resource allocation function by determining the status and capability of the intelligent peripheral resources and assigning a request to an intelligent peripheral resource based on the determination.

7. The system according to claim 6, further comprising:

at least one service control point connected to the at least one first switch through the network.

8. The system according to claim 7, wherein the service control point directs telephone calls to the intelligent peripheral concentrator or to another network resource.

9. The system according to claim 6, wherein the at least one first switch handles media streams in TDM or packetized format.

10. The system according to claim 6, wherein the intelligent peripheral concentrator performs media format translation between a packet-based and a circuit-based technology, and between different packet-based technologies.

11. The system according to claim 6 wherein the intelligent peripheral performs at least one of digit collection, voice and video playback, announcement playback, voice and video recording, music recording and playback, collect call processing, forwarding requests and information, pager notification and telephonic alerts.

12. The system according to claim 6, wherein the system further comprises at least one of conventional telephone lines, digital transmission facilities, fiber optic lines, direct serial/parallel connections, wireless connections, cellular telephone connections, satellite communications, local area networks and intranet connections for coupling between the at least one device, the at least one first switch, the at least one other switch, the at least one intelligent peripheral concentrator and at least one intelligent peripheral.

* * * * *